(12) United States Patent
Feldmann et al.

(10) Patent No.: US 8,561,947 B2
(45) Date of Patent: Oct. 22, 2013

(54) METHOD AND SYSTEM FOR A REFUELING DROGUE ASSEMBLY

(75) Inventors: Michael Steven Feldmann, Rockford, MI (US); Lawrence William Stimac, Caledonia, MI (US); Frank Saggio, III, Grand Rapids, MI (US); Mark Lawrence Turner, Grand Rapids, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 18 days.

(21) Appl. No.: 12/984,961

(22) Filed: Jan. 5, 2011

(65) Prior Publication Data

US 2012/0168564 A1    Jul. 5, 2012

(51) Int. Cl.
    *B64D 39/00*      (2006.01)

(52) U.S. Cl.
    USPC ............... 244/135 A; 244/135 R; 244/1 TD

(58) Field of Classification Search
    USPC ............................... 244/135 A, 135 R, 1 TD
    See application file for complete search history.

(56) References Cited

U.S. PATENT DOCUMENTS

| | | | | |
|---|---|---|---|---|
| 2,941,761 A | * | 6/1960 | Cox et al. | 244/135 A |
| 3,475,001 A | * | 10/1969 | Hieber | 251/149.8 |
| 3,794,270 A | * | 2/1974 | Wilkens | 244/172.4 |
| 4,381,092 A | * | 4/1983 | Barker | 244/172.4 |
| 4,431,333 A | | 2/1984 | Chandler | |
| 5,131,438 A | * | 7/1992 | Loucks | 141/1 |
| 5,255,877 A | | 10/1993 | Lindgren et al. | |
| 5,326,052 A | * | 7/1994 | Krispin et al. | 244/135 A |
| 5,427,333 A | | 6/1995 | Kirkland | |
| 5,906,336 A | * | 5/1999 | Eckstein | 244/135 A |
| 6,375,123 B1 | | 4/2002 | Greenhalgh et al. | |
| 6,604,711 B1 | * | 8/2003 | Stevens et al. | 244/135 A |
| 6,669,145 B1 | * | 12/2003 | Green | 244/135 A |
| 6,869,042 B2 | * | 3/2005 | Harrison | 244/2 |
| 6,889,941 B1 | * | 5/2005 | McElreath et al. | 244/135 A |
| 6,926,049 B1 | * | 8/2005 | Enig et al. | 141/387 |
| 6,966,525 B1 | * | 11/2005 | Schroeder | 244/135 A |
| 6,988,693 B2 | * | 1/2006 | Shelly | 244/135 A |
| 6,994,294 B2 | * | 2/2006 | Saggio et al. | 244/135 A |
| 7,007,894 B1 | * | 3/2006 | Takacs et al. | 244/135 A |

(Continued)

FOREIGN PATENT DOCUMENTS

EP      2148119 A2      1/2010

OTHER PUBLICATIONS

Search Report and Written Opinion from EP Application No. 12150105.0 dated Feb. 27, 2013.

*Primary Examiner* — Tien Dinh
*Assistant Examiner* — Justin Benedik
(74) *Attorney, Agent, or Firm* — Armstrong Teasdale LLP

(57) ABSTRACT

A method and system for a refueling drogue coupling system are provided. The system includes a coupling latch assembly coupled to the coupling outlet wherein the coupling latch assembly includes a latch member configured to matingly engage a complementary latch-receiving member of a refueling probe. The coupling latch assembly further includes a latch member actuator operatively coupled to the latch member to permit the latch member to move from a first locked position to a second unlocked position. A probe position sensor is configured to detect a position of the refueling probe. A hose tension sensor is configured to measure a tension in a hose coupled to the coupling inlet. A drogue control system is positioned on the refueling drogue coupling system and communicatively coupled to the latch member actuator, the probe position sensor, and the hose tension sensor.

19 Claims, 3 Drawing Sheets

(56) References Cited

U.S. PATENT DOCUMENTS

| | | | |
|---|---|---|---|
| 7,036,770 B2 * | 5/2006 | Shelly et al. | 244/135 A |
| 7,137,598 B2 * | 11/2006 | Von Thal | 244/135 A |
| 7,185,854 B2 * | 3/2007 | Von Thal et al. | 244/135 A |
| 7,219,857 B2 | 5/2007 | Takacs et al. | |
| 7,686,252 B2 | 3/2010 | Mickley et al. | |
| 2005/0045768 A1 * | 3/2005 | Saggio et al. | 244/135 A |
| 2006/0065785 A1 | 3/2006 | Enig et al. | |
| 2006/0145023 A1 * | 7/2006 | Babb et al. | 244/172.4 |
| 2007/0108339 A1 | 5/2007 | Plotkin | |
| 2010/0001124 A1 | 1/2010 | Feldmann | |
| 2010/0108815 A1 | 5/2010 | Stecko et al. | |
| 2010/0163679 A1 | 7/2010 | Mickley et al. | |
| 2010/0270431 A1 | 10/2010 | Mouskis | |

* cited by examiner

METHOD AND SYSTEM FOR A REFUELING DROGUE ASSEMBLY

BACKGROUND OF THE INVENTION

The field of the invention relates generally to in-flight refueling drogues, and more specifically, to a method and system for an air-refueling drogue that provides positive latch indication of a refueling probe, reduced force latching/detaching, measurement of hose tension at the drogue end instead of at the reel end, and transmission of hose tension measurement and positive latch indication to the hose reel control system.

Current probe and drogue aerial refueling systems infer coupling of the receiver aircraft probe with the tanker aircraft drogue on the basis of measurement of a hose tension decrease when the receiver aircraft pushes on the drogue with the refueling probe. At least two known categories of prior attempts to solve the problem, both use measurements taken at the hose reel. One method uses detection of an imbalance in hydraulic pressure to infer coupling of the receiver. Another method uses a load cell to measure a change in hose tension and infer coupling. Both of these methods are subject to false indications caused by friction as well as aerodynamic and receiver aircraft induced forces that cause false inference of coupling. Such methods are used because power, including electrical, hydraulic, pneumatic power, is not available at the drogue to allow additional remote sensing to give positive indication and control of coupling. Batteries could be used, however batteries have capacity, heating, charging, and power life aspects to contend with. The other approach is to incorporate wires or optical fibers, or the like, in the aerial refueling hose. Both of these are undesirable from an operational complexity, durability, cost, and safety view.

BRIEF DESCRIPTION OF THE INVENTION

In one embodiment, a refueling drogue coupling system includes a coupling latch assembly incorporated into the coupling outlet wherein the coupling latch assembly includes a latch member configured to matingly engage a complementary latch-receiving member of a refueling probe. The coupling latch assembly further includes a latch member actuator operatively coupled to the latch member to permit the latch member to move from a first locked position to a second unlocked position. A probe position sensor is configured to detect a position of the refueling probe. A hose tension sensor is configured to measure a tension in a hose coupled to the coupling inlet. A drogue control system is positioned on the refueling drogue coupling system and communicatively coupled to the latch member actuator, the probe position sensor, and the hose tension sensor.

In another embodiment, a method of operating a refueling drogue assembly includes inserting a refueling probe of a receiving aircraft into an opening of the refueling drogue assembly extending from a tanker aircraft, detecting a presence of the refueling probe in a predetermined position of the refueling drogue assembly, and engaging a latch member of the refueling drogue assembly to a complementary latch-receiving member of the refueling probe using an actuator.

In yet another embodiment, an aerial refueling system includes a refueling drogue coupling system configured to be extended from a tanker aircraft at a distal end of a refueling hose. The refueling drogue coupling system includes a coupling latch assembly including a latch member configured to matingly engage a complementary latch-receiving member of a refueling probe, the coupling latch assembly further configured to move the latch member from a first locked position to a second unlocked position using a latch member actuator, a hose tension control subsystem positioned in the tanker aircraft and coupled to a proximal end of the refueling hose opposite the distal end, and a drogue controller wirelessly communicatively coupled to a hose tension controller positioned in the tanker aircraft.

BRIEF DESCRIPTION OF THE DRAWINGS

FIG. 1 is a side view of a refueling aircraft with a refueling drogue assembly deployed in accordance with an exemplary embodiment of the present invention.

FIG. 2 is a side view of the refueling drogue assembly shown in FIG. 1 in accordance with an exemplary embodiment of the present invention.

FIG. 3 is a side partially cutaway view of refueling drogue assembly 102 and refueling probe 116 in accordance with an exemplary embodiment of the present invention.

DETAILED DESCRIPTION OF THE INVENTION

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods of operating a drogue refueling system. However, it is contemplated that this disclosure has general application to fluid couplings in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention provide a positive, deterministic, means of establishing if a receiver aircraft probe is coupled with a refueling drogue in order to allow the refueling systems hose reel control system to properly initiate hose tension regulation and prevent hazardous hose whip.

The embodiments also provide a means of positively coupling the probe and drogue at low force levels, thus allowing operations across wider airspeed and altitude envelopes. Additionally, unambiguous disconnect (due to emergency, failure, etc.) may also be commanded from either the receiver or tanker aircraft.

Furthermore, the embodiments provide direct measurement of hose load at the drogue, thereby alleviating problems caused by attempts to infer hose load at the drogue by measuring hose load at the hose reel (via load cells or hydraulic pressure) as is common in existing systems.

Although described as a tanker aircraft/receiver aircraft configuration where the tanker leads the receiver, as is conventional, embodiments of the present invention also permit a configuration where the receiver is in front of the tanker and the tanker follows. In this configuration the tanker pumps fuel up the hose to the receiver instead of the tanker pumping fuel down the hose to the following receiver.

Figure 1:
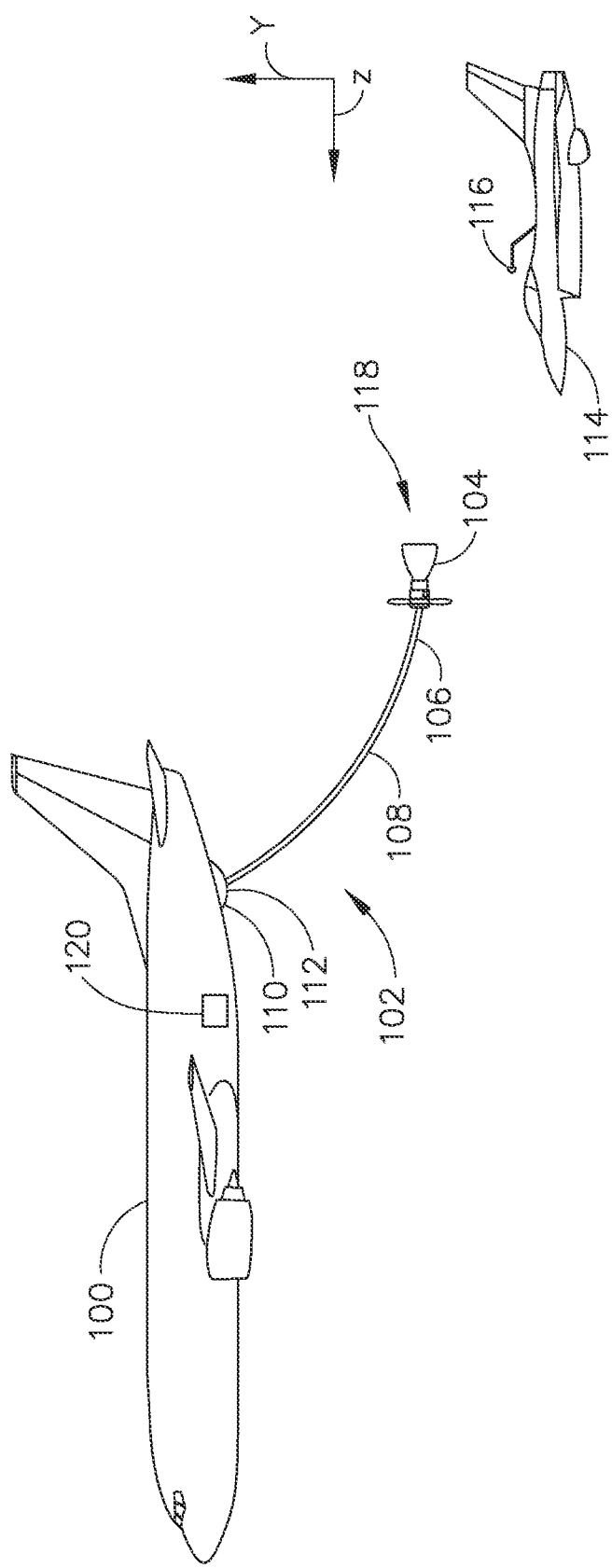
FIGS. 1-3 show exemplary embodiments of the method and system described herein.

FIG. 1 is a side view of a refueling aircraft 100 with a refueling drogue assembly 102 deployed in accordance with an exemplary embodiment of the present invention. In the exemplary embodiment, refueling drogue assembly 102 includes a refueling drogue basket 104 connected to a distal portion 106 of a refueling hose 108 that is in turn connected to aircraft 100. A hose reel 110 and a hose tension control system 112 are positioned on refueling aircraft 100. Hose tension control system 112 is configured to maintain forces, such as, but not limited to, aerodynamic drag, gravity, refueling probe, and dynamics, acting on refueling drogue assembly 102 balanced such that positional control of refueling drogue assembly 102 is maintained.

During a refueling operation, refueling drogue basket 104 is unreeled from refueling aircraft 100 towards a receiver aircraft 114 (an aircraft to be refueled), such as, but not limited to, a fighter plane or a helicopter. A refueling probe 116 extends from receiver aircraft 114. Receiver aircraft 114 maneuvers refueling probe 116 to refueling drogue basket 104 and inserts refueling probe 116 into a rearward facing opening 118 of refueling drogue basket 104, at which point a refueling coupling (not shown in FIG. 1) "locks" onto refueling probe 116, and a transfer of fuel from refueling aircraft 100 to receiver aircraft 114 is conducted.

Figure 2:
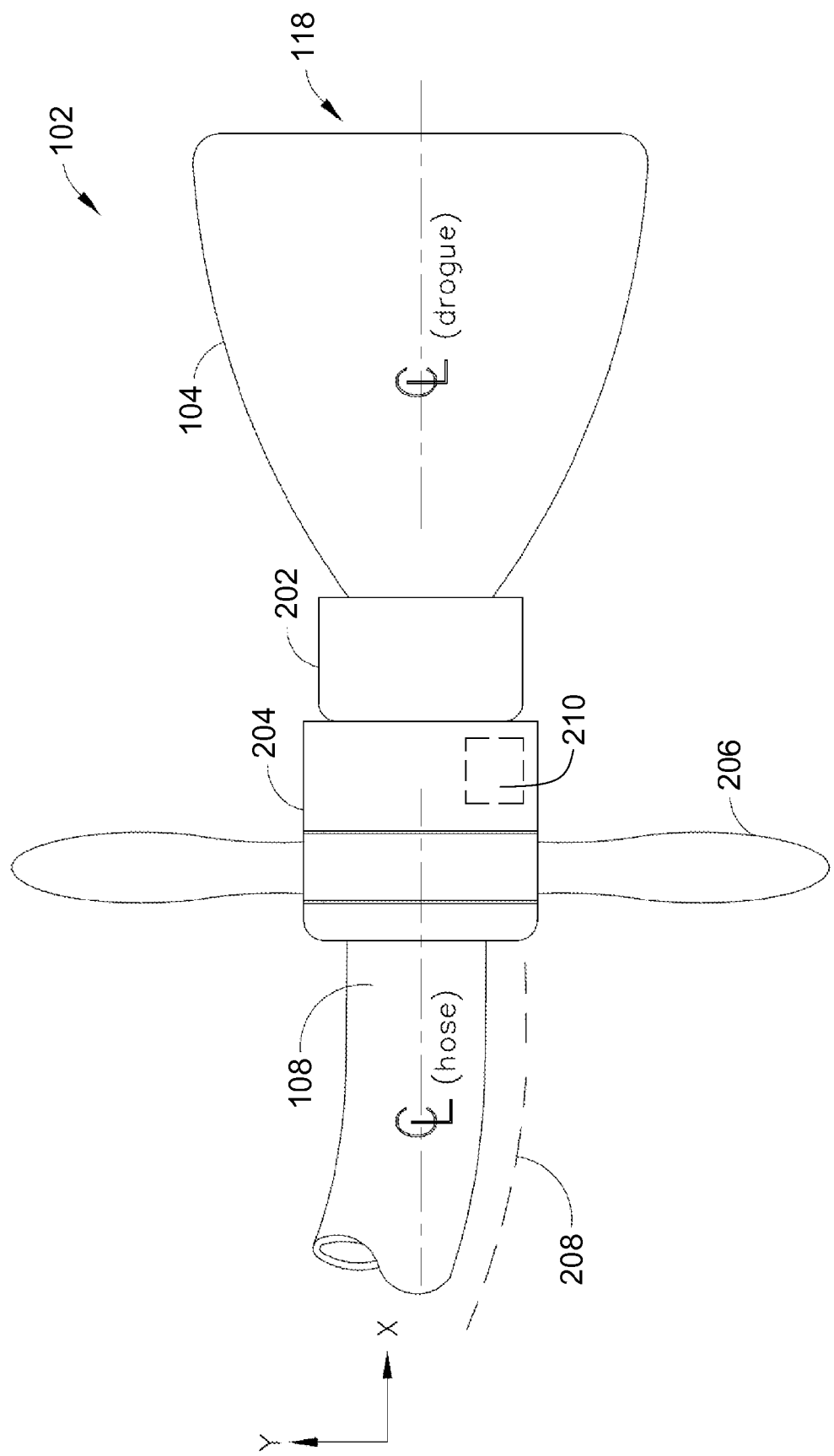

FIG. 2 is a side view of refueling drogue assembly 102 (shown in FIG. 1) in accordance with an exemplary embodiment of the present invention. In the exemplary embodiment, refueling drogue basket 104 is coupled to hose 108 through a basket collar 202 and a hose end connector 204. In various embodiments, a ram air turbine 206 is used to generate electrical energy to power components of refueling drogue assembly 102. A gyroscopic effect of ram air turbine 206 during operation may also be used to positionally stabilize refueling drogue assembly 102. In various other embodiments, a cable 208 may be used to carry electrical energy between refueling drogue assembly 102 and an off-board power supply 120 positioned on aircraft 100 and/or control signals between refueling drogue assembly 102 and aircraft 100. In still other embodiments, refueling drogue assembly 102 may be powered by a battery 210 carried onboard refueling drogue assembly 102.

Figure 3:
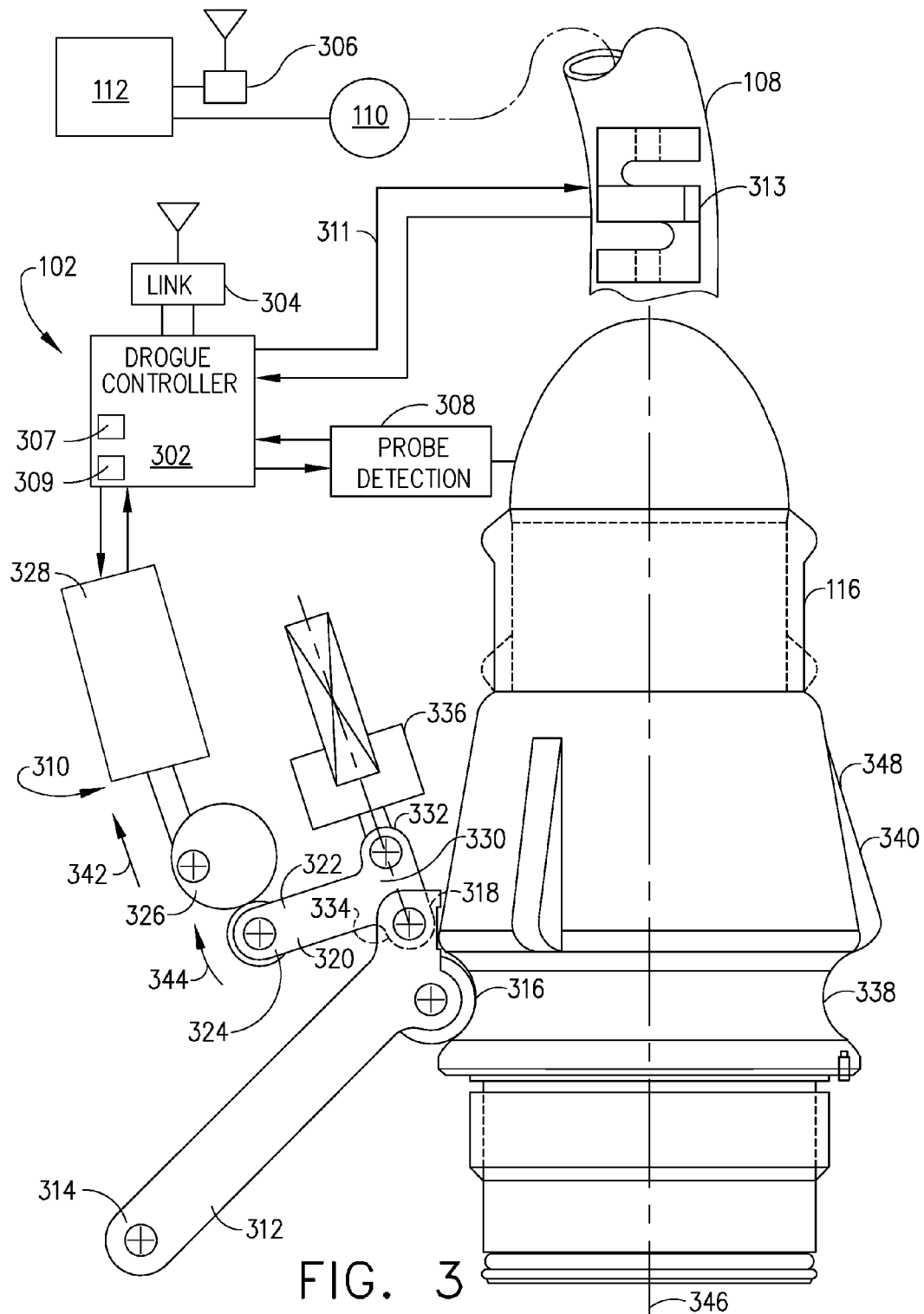

FIG. 3 is a side partially cutaway view of refueling drogue assembly 102 and refueling probe 116 in accordance with an exemplary embodiment of the present invention. In the exemplary embodiment, refueling drogue assembly 102 includes a drogue controller 302 communicatively coupled to hose tension control system 112 using, in one embodiment, a wireless connection through a communications link 304 on refueling drogue assembly 102 and a link 306 at hose tension control system 112. Drogue controller 302 includes a processor 307 and a memory 309 for executing programmed instructions that perform the processes described herein. Refueling drogue assembly 102 also includes a refueling probe position sensor 308 configured to detect a presence of refueling probe 116 in refueling drogue assembly 102 a position of refueling probe 116 relative to a predetermined inserted position of refueling probe 116 into refueling drogue assembly 102. A hose tension sensor 313 is communicatively coupled to hose tension control system 112 through a communication link 311.

A latch assembly 310 includes a latch member 312 comprising a first pivot end 314, a locking roller 316, and a second pivot end 318. Latch assembly 310 also includes a toggle member 320 comprising an elongate body 322 having a first end 324 configured to engage a cam 326 pivotally coupled to latch member actuator 328 and a second end 330 comprising first 332 and second 334 orthogonally extending arms, said first arm 332 coupled to a latch assembly bias member 336, said second arm 334 coupled to said latch member 312. Locking roller 316 is configured to engage a complementary latch-receiving member 338 of refueling probe 116. In the exemplary embodiment, latch-receiving member 338 comprises a circumferential groove formed in a probe collar 340 of refueling probe 116.

During operation, to initiate a refueling procedure, hose 108 is played out from reel 110 by hose tension control system 112 automatically, upon input by an operator, or in response to preprogrammed instructions. When hose 108 is played out to a predetermined length, receiving aircraft 114 approaches refueling drogue assembly 102 and inserts refueling probe 116 into opening 118. Latch assembly 310 is in an unlocked position such that actuator 328 is positioned in a retracted direction 342, which permits toggle member 320 to rotate in a clockwise direction 344, which in turn withdraws locking roller 316 away from longitudinal axis 346. Refueling probe 116 is able to be inserted using a relatively small amount of force. When refueling probe position sensor 308 detects the presence of refueling probe 116 at a predetermined position within refueling drogue assembly 102, drogue controller 302 commands latch assembly 310 to actuate thereby positioning locking roller 316 into engagement with latch-receiving member 338. This procedure, using refueling drogue assembly 102, permits insertion of refueling probe 116 with relatively less force and a positive determination that refueling probe 116 is in a proper position for latching the locking roller 316 onto latch-receiving member 338. Once refueling probe 116 is positively engaged with refueling drogue assembly 102, drogue controller 302 commands hose tension control system 112 to operate to control tension in hose 108.

In another embodiment, with latch assembly 310 in a locked position, locking roller 316 is projected toward longitudinal axis 346 and presents an obstacle to entry of refueling probe 116 into refueling drogue assembly 102. Such obstacle is overcome by using a relatively greater force that forces toggle member 320 to work against bias member 336 to permit locking roller 316 to be pushed out of the path of refueling probe 116 by riding up inclined surface 348 of probe collar 340.

At the conclusion of a refueling operation or in an off normal condition either tanker aircraft 100 or receiver aircraft 114 may send a disengage signal to drogue controller 302 to automatically disengage refueling probe 116 from refueling drogue assembly 102. During disengagement, drogue controller 302 sends a signal to latch member actuator 328 causes latch member actuator 328 to move to an unlock position that disengages locking roller 316 from latch-receiving member 338. Refueling probe 116 is then able to pull away from refueling drogue assembly 102 with a relatively small amount of disengagement force.

Embodiments of the present invention positively determine, using a sensor, such as, but not limited to, a mechanical, an optical, or a proximity detecting switch, or by using a pulse waveform detected by an accelerometer, or a combination of the above, that the refueling probe is fully latched in the drogue coupling assembly, and by measuring hose load at the drogue assembly by means of a, for example, strain gauge transducer, and then transmitting these facts and measurements via wireless data link (RF, Electro-Optical, optical fiber, etc.) to a tanker hose tension control system for the hose tension control system to begin regulating hose tension prior to development of hazardous hose whip as well as improving the quality of regulation of hose tension during tanker and receiver relative motion via direct measurement of hose load at the drogue.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 307, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is an improvement in the safety of probe and drogue aerial refueling operations and improvements in the operational envelope (expanded ranges of altitude and airspeed) over which refueling operations can be conducted. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of operating a drogue refueling system provides a cost-effective and reliable means ensuring a positive coupling of a refueling probe to a refueling drogue. More specifically, the method and system described herein facilitate coupling at relatively lower axial force. In addition, the above-described method and system facilitate supplying power to the drogue assembly. As a result, the method and system described herein facilitate coupling and uncoupling a refueling drogue assembly and refueling probe, directly measuring and transmitting hose load, and communicating system status and health in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A refueling drogue coupling system for a refueling drogue assembly, said system comprising:

a fluid passage extending from a coupling inlet to a coupling outlet, said fluid passage comprising a valve seat circumscribing said fluid passage proximate said coupling outlet;

a valve plug assembly comprising a valve plug configured to engage said seat to prevent flow through said fluid passage and an actuator assembly comprising a bias member;

a coupling latch assembly incorporated into said coupling outlet, said coupling latch assembly comprising a latch member configured to matingly engage a complementary latch-receiving member of a refueling probe, said latch member comprising a first pivot end, a locking roller, and a second pivot end, said coupling latch assembly further comprising a latch member actuator operatively coupled to said latch member to permit said latch member to move from a first locked position to a second unlocked position, wherein in a first locked position, said locking roller prevents removal of the refueling probe from said refueling drogue assembly and in the second unlocked position, said locking roller is withdrawn away from a longitudinal axis of the refueling probe and the refueling probe is permitted entry into or removal from said refueling drogue assembly;

a probe position sensor positioned on the refueling drogue assembly and configured to detect a position of the refueling probe in the refueling drogue assembly at a position of the refueling probe relative to a predetermined inserted position of the refueling probe into the refueling drogue assembly, said probe position sensor configured transmit to a drogue controller a signal indicating a positive determination that the refueling probe is in the proper position for latching the locking roller onto the latch-receiving member wherein in the proper position, said latch member is in the second unlocked position;

a hose tension sensor configured to measure a tension in a hose coupled to said coupling inlet; and a drogue controller positioned on said refueling drogue coupling system and communicatively coupled to said latch member actuator, said probe position sensor, and said hose tension sensor.

2. A system in accordance with claim 1, further comprising a drogue power supply system positioned on said refueling drogue coupling system and configured to supply power to said refueling drogue coupling system.

3. A system in accordance with claim 1, further comprising a drogue power supply system comprising at least one of a ram air turbine and a battery positioned on said refueling drogue coupling system, and a cable electrically coupled between said drogue power supply system and an offboard power supply.

4. A system in accordance with claim 1, further comprising a hose tension control subsystem comprising:

a refueling hose coupled in flow communication with said flow passage;

a reel configured to configured to rotate about an axis to store and play out said refueling hose; and an actuator drivingly coupled to said reel.

5. A system in accordance with claim 1, wherein said hose tension control subsystem is communicatively coupled to said drogue controller and configured to receive signals relative to hose tension from said hose tension sensor.

6. A system in accordance with claim 1, wherein said coupling latch assembly comprises a toggle member comprising an elongate body having a first end configured to engage a cam pivotally coupled to said latch member actuator and a second end comprising first and second orthogonally extending arms, said first arm coupled to a latch assembly bias member, said second arm coupled to said latch member.

7. A system in accordance with claim 1, wherein said coupling latch assembly is configured to lock on to the refueling probe using a first amount of axial force when said coupling latch assembly is in a said unlocked position and to lock on to the refueling probe using a second amount of axial force when said coupling latch assembly is in a said locked position, wherein said first amount of axial force is less than said second amount of axial force.

8. A system in accordance with claim 7, wherein said coupling latch assembly is configured to lock on to the refueling probe using a first amount of axial force that is sufficient to overcome a force imparted by said latch assembly bias member.

9. A method of operating a refueling drogue assembly, said method comprising:
  coupling a refueling drogue assembly to a distal end of a hose extendable from a tanker aircraft, the refueling drogue assembly including latch member and a probe position sensor;
  positioning a refueling probe on a receiving aircraft, the refueling probe including a latch-receiving member that is complementary to the latch member;
  inserting the refueling probe of the receiving aircraft into an opening of the refueling drogue assembly extending from the tanker aircraft;
  detecting a presence of the refueling probe in the refueling drogue assembly at a position of the refueling probe relative to a predetermined inserted position of the refueling probe into the refueling drogue assembly using the probe position sensor and
  permitting the latch member to move from a first locked position to a second unlocked position based on an indication generated by the probe position sensor,
  in the first locked position, the locking roller prevents removal of the refueling probe from the refueling drogue assembly, and
  in the second unlocked position, the locking roller is withdrawn away from the refueling probe so that the refueling probe is permitted entry into or removal from the refueling drogue assembly; and
  engaging the latch member of the refueling drogue assembly to the complementary latch-receiving member of the refueling probe using an actuator.

10. A method in accordance with claim 9, further comprising monitoring a tension in a refueling hose coupled in flow communication with the refueling drogue assembly.

11. A method in accordance with claim 10, further comprising monitoring a tension in the refueling hose using a strain gauge.

12. A method in accordance with claim 9, further comprising adjusting a tension in a refueling hose coupled in flow communication with the refueling drogue assembly based on a tension signal received from a refueling hose tension sensor.

13. A method in accordance with claim 9, wherein the refueling drogue assembly includes a drogue control system positioned on the refueling drogue assembly, said method further comprising powering the refueling drogue assembly using a ram air turbine.

14. A method in accordance with claim 9, further comprising:
  receiving a disengage command from at least one of the receiving aircraft and the tanker aircraft; and
  disengaging the latch member of the refueling drogue assembly using the actuator.

15. A method in accordance with claim 9, further comprising supplying power to the refueling drogue assembly from a power source located on the refueling drogue assembly.

16. An aerial refueling system comprising:
  a refueling drogue coupling system configured to be extended in a drogue assembly from a tanker aircraft at a distal end of a refueling hose, said refueling drogue coupling system comprising a coupling latch assembly comprising a latch member configured to matingly engage a complementary latch-receiving member of a refueling probe, said latch member comprising a first pivot end, a locking roller, and a second pivot end, said coupling latch assembly further configured to move said latch member to move from a first locked position to a second unlocked position using a latch member actuator, wherein in a first locked position, said locking roller prevents removal of the refueling probe from said refueling drogue assembly and in the second unlocked position, said locking roller is withdrawn away from a longitudinal axis of the refueling probe and the refueling probe is permitted entry into or removal from said refueling drogue assembly;
  a hose tension control subsystem positioned in the tanker aircraft and coupled to a proximal end of the refueling hose opposite the distal end;
  a hose tension sensor positioned on the drogue assembly and communicatively coupled to the hose tension control subsystem through a wireless communication link;
  a refueling probe position sensor positioned on the refueling drogue assembly and configured to detect a position of a refueling probe and transmit a signal to said drogue controller indicating a positive determination that the refueling probe is in the proper position for latching the locking roller onto the latch-receiving member wherein in the proper position, said latch member is in the second unlocked position; and
  a drogue controller wirelessly communicatively coupled to a hose tension controller positioned in the tanker aircraft.

17. A system in accordance with claim 16, further comprising a hose tension sensor configured to measure a tension in the refueling hose proximate the distal end and said refueling drogue coupling system.

18. A system in accordance with claim 16, wherein said latch member actuator is communicatively coupled to said drogue controller.

19. A system in accordance with claim 16, further comprising a drogue power supply system comprising at least one of a ram air turbine and a battery positioned on said refueling drogue coupling system, and a cable electrically coupled between said drogue power supply system and an offboard power supply.

* * * * *